United States Patent [19]

Harris

[11] 4,430,698
[45] Feb. 7, 1984

[54] THREE-MODE PROCESS CONTROL
[75] Inventor: Holton E. Harris, Westport, Conn.
[73] Assignee: Harrel, Incorporated, East Norwalk, Conn.
[21] Appl. No.: 294,726
[22] Filed: Aug. 20, 1981
[51] Int. Cl.³ .................. G05B 11/36; G05B 11/42
[52] U.S. Cl. ................... 364/162; 364/160; 364/161; 364/163; 364/164; 364/165; 318/609; 318/610; 318/561
[58] Field of Search ............ 318/609, 610, 561; 364/160, 161, 162, 163, 164, 165

[56] References Cited
U.S. PATENT DOCUMENTS

| | | | |
|---|---|---|---|
| 3,710,086 | 1/1973 | Lahde et al. | 364/160 |
| 3,741,474 | 6/1973 | Kawada et al. | 318/610 |
| 3,770,946 | 11/1973 | Fertik et al. | 364/162 |
| 3,778,025 | 12/1973 | Lane et al. | 318/610 |
| 3,781,626 | 12/1973 | Kubo et al. | 318/609 |
| 3,786,242 | 1/1974 | Brooks | 364/162 |
| 3,826,887 | 7/1974 | Pemberton | 364/162 |
| 3,834,617 | 9/1974 | Dyntar | 318/610 |
| 3,895,280 | 7/1975 | Peterson | 318/610 |
| 4,025,763 | 5/1977 | Kleiss | 364/160 |
| 4,090,121 | 5/1978 | Nelson et al. | 318/610 |
| 4,163,279 | 7/1979 | Kubota | 318/610 |
| 4,215,397 | 7/1980 | Hom | 364/162 |
| 4,272,466 | 6/1981 | Harris | 264/40.6 |
| 4,275,439 | 6/1981 | Kunata | 318/561 |
| 4,276,603 | 6/1981 | Beck et al. | 364/162 |
| 4,319,173 | 3/1982 | Rhodes | 318/609 |

OTHER PUBLICATIONS
"Writing P-I-D Control Loops Easily in Basic," Fishbeck, J., Control Engineering, Oct. 1978, pp. 45–47.

Primary Examiner—Jerry Smith
Assistant Examiner—John R. Lastova, III
Attorney, Agent, or Firm—Brumbaugh, Graves, Donohue & Raymond

[57] ABSTRACT

In a P-I-D process control where a process variable is controlled employing the three mode equation:

$$\text{Output} = K_1 E + K_2 \int E\,dt + K_3 (dE/dt)$$

the sign of the derivative is compared with the sign of the error. If the derivative and error signs are unlike then the derivative term is discarded. Discarding the derivative term when its sign is unlike that of the error E, prevents the derivative opposing the return of the process variable towards the desired value or "set point."

5 Claims, 4 Drawing Figures

THREE-MODE PROCESS CONTROL

BACKGROUND OF THE INVENTION

The most common method of controlling any temperature, pressure, rpm, or other process parameter, where high precision and good accuracy are required, is the so-called three-mode equation:

$$\text{Output} = K_1 E + K_2 \int E \, dt + K_3 (dE/dt)$$

Where:
Output = the power output to the load, intended to hold that load to the desired process conditions,
E = the error signal, or difference between the actual value of the controlled parameter and the desired value, and
$K_1$, $K_2$, $K_3$ are constants.

This is also called the P-I-D or Proportional-Integral-Derivative method because it consists of a proportional term plus an integral term plus a derivative term. This process control method has been practiced for quite some time using both older, conventional (analog) control systems or "controllers", and, more recently, using newer digital equipment. See, for example, the inventor's article "Temperature Controllers for Plastic Machinery", Plastics Design and Processing, April, 1970, p. 36, and J. Fishbeck, "Writing P-I-D Control Loops Easily in BASIC", Control Engineer, October, 1978, p. 45.

The following considers each term of the above equation in turn.

Proportional Term ($K_1 E$)

This term states that there must be an output to the load which is proportional to the error. In other words, the further the measured value of a parameter is from the set point (the intended value of the controlled process parameter), the larger the output will be. If this were the only term which is operative, a point of equilibrium would be reached where the output is just large enough to prevent the deviation from set point from getting any higher.

The important point to note, however, is that a so-called proportional controller, or a controller with only this proportional term, can never operate at the set point. Consider a proportional controller, for example, which is applying power to a heater to control the temperature of a load. Whenever the actual temperature of the load is the same as the set point temperature (E=0) there can be no output power, and hence the load will cool. It will cool until an equilibrium is reached where the error is large enough so that the output power is sufficient to supply the heat losses and prevent further drop in temperature. The value of the error, or difference between actual and set point at this equilibrium point in temperature controllers that are proportional only, is called the temperature "droop" or offset.

The worst feature of this droop is that it will not remain constant. As the heat load changes, due to, for example, changes in ambient temperature, heat losses to the heated product, or heat input from other sources, the amount of output power required will also change. But this means the droop and hence the operating temperature will also change. In other words, a proportional process controller is one in which the process is not really held constant.

Integral Term ($K_2 \int E \, dt$)

To overcome the varying offset or "droop" an integral term is added. In a temperature controller this integral term is known as automatic reset.

The way integral control or automatic reset works is to let the effect of an error accumulate over a period of time. As long as there is any error at all, this term will continue to increase. One can make the time of integration long enough so that it will not make the system unstable, and if one integrates long enough, a very small error will contribute a very large output.

The practical effect of this integral term is to drive the error to zero, or as near zero as the controller can recognize. For as long as there is any recognizable error, the integral term will increase the output, which in turn will reduce the error. The addition of the integral term, therefore, means that in the steady state, operation of a temperature controller will always be at the set point, regardless of the heat load.

There are, however, two troubles with automatic reset:

1. Automatic reset is very slow acting. If an upset occurs, the load requiring more power, for example, there is no immediate contribution from the integral term. The actual process value will be driven off the set point by an amount limited only by the proportional term. The new error will then cause a slowly changing output which will eventually integrate out the error and restore the actual temperature to the set point value. However, this may take too much time.

2. The integral or reset circuits are subject to saturation effects. In a temperature controller, for example, the output power is not infinite, but is limited by the power of the heater. During initial warm-up, the proportional and integral term will both go to their maximum allowable values and stay there. When the limit of the proportional band—i.e. the temperature at which the proportional term acting alone would just produce full output—the proportional output will start scaling down. The integral term, however, will not start decreasing from full output until after the set point is passed so that the error changes sign. It will then start integrating downward, but meantime the temperature can overshoot quite severely.

"Overshoot limiting" circuits are conventionally used to solve the second problem. One such circuit in widespread use keeps the integrating term at zero until the limits of the proportional load are reached, so that there is no large initial error to be integrated out.

Rate Term ($K_3 [dE/dt]$)

A rate term, the derivative term in the above equation, is provided in the three-mode controller primarily to solve the first problem associated with automatic reset as per the above, though it also helps with the second. Rate is not active under steady state conditions. In other words it makes no contribution as long as the proportional and integral terms as holding the actual process value at the set point.

If the load varies, however, so that the actual process value is driven off the set point, the rate term comes into effect. Rate, or derivative action, operates on the rate of change of the process variable. Further it acts to oppose the change.

If a three-mode temperature controller is operating at the set point, for example, and the heat load changes (as occurs from ambient temperature changes or changes in other process variables), the temperature will tend to deviate from the set point. In the intial period the proportional term will provide no correction for it has to wait until there is appreciable error to have much effect. The integral term, likewise, will not do anything until it has had time to build up the integral. The rate or derivative term, however, can operate immediately. As soon as there is a rate of change, the rate term will add in an output term which will be in the direction to oppose the change and to limit the amount of deviation that will be caused by any upset.

Disadvantages of Convention Rate Control

If a sufficiently large upset occurs in the system, due, for instance, to a major change in the load, it is apparent that the actual value of the process variable will be driven off the set point. Rate action will tend to limit how far it is driven off, but it cannot in general prevent it. Once the variable returns towards the set point, the derivative (dE/dt) will change sign and the rate term will actually oppose the return towards the set point.

BRIEF SUMMARY OF THE INVENTION

In accordance with this invention there is provided a method of controlling a process that simply and effectively avoids the disadvantage of a P-I-D control rate term opposing return of the variable towards the desired value or "set point". First, the rate term is permitted to operate normally whenever the sign of the rate of change term indicates the measured process variable parameter being controlled is moving away from the set point or desired value, and second, the rate term is at least substantially reduced whenever the sign of the rate term indicates that the actual measured parameter is moving toward the set point. Preferably the rate term is reduced to zero, or in other words disabled, when the temperature moves towards the set point.

It is not enough to disable rate whenever the sign of the derivative is positive or negative. An upset can occur in either direction from the set point, and hence the corrective action of the rate term can correspond to either plus or minus rates of change. One must test to see, therefore, whether the plus or minus value represents a rate of change toward or away from the set point. This is done by comparing the sign of the error E and the sign of the derivative term (dE/dt). If these signs are alike the change is away from the set point, if the signs are unlike the change is towards the set point.

In a plastics extruder, in particular, comparison of the sign of the error and the sign of the derivative of the error with respect to time can be accomplished using known multichannel digital controllers, currently available. The invention can be practiced for each of the multiple zones of an extruder with multiple temperature control zones along the length of the barrel. Furthermore, the invention can be practiced, as well, with a system employing variable set point according to this inventor's U.S. Pat. No. 4,272,466.

In any process capable of conventional P-I-D mode control, the improved method of this invention can be used. The process can be practiced using, in addition to appropriate sensors and process control means, microprocessor based circuitry with memory, a programmed general purpose computer, or analog circuitry to make the several calculations and comparisons required or approximations thereof.

The substantial reduction of the rate term referred to herein, when the sign of the error and the sign of the derivative (dE/dt) are unlike, can be the application of a derivative term of reversed sign from that of the actual calculated derivative (dE/dt), but this might decrease the error too quickly towards the set point and result in overshoot. Likewise, within the spirit of this invention, the derivative term could be reduced but not eliminated. This would improve the rate at which the error was diminished, but would nevertheless oppose the diminution of the error to some extent. For these reasons, the rate term is preferably eliminated when the rate term indicates that the variable is returning to the desired set point value.

The above and further advantages of the invention will be better understood with respect to the following detailed description of a preferred embodiment, taken in combination with the several figures of the associated drawings.

DESCRIPTION OF PREFERRED EMBODIMENT

Figure 1:
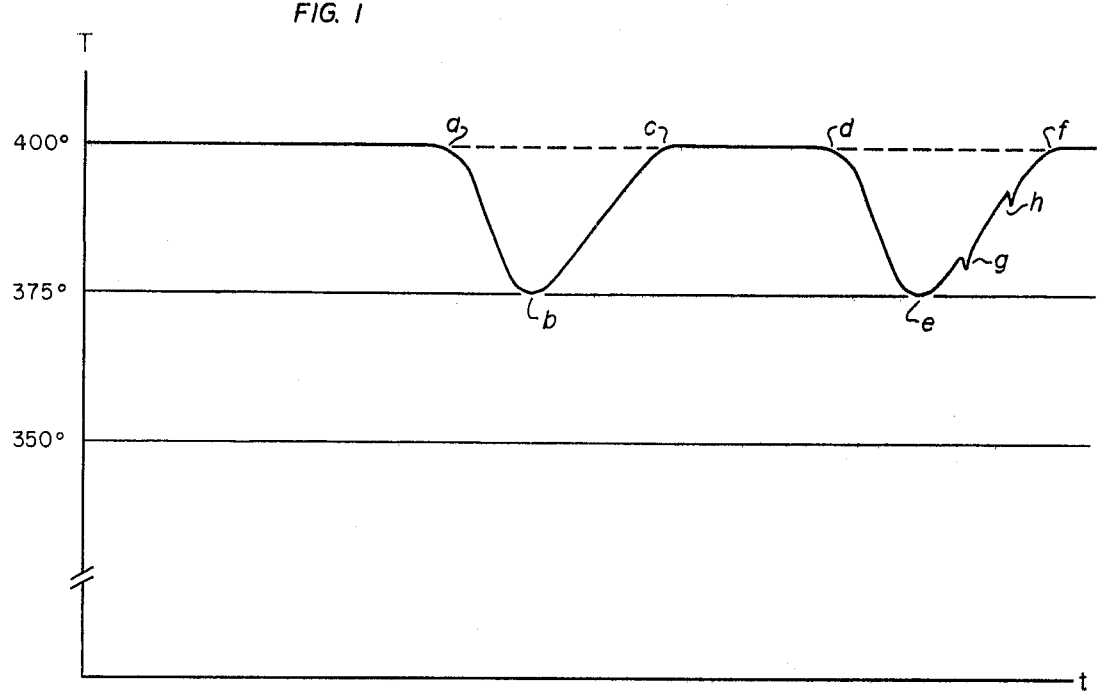
FIG. 1 is a plot of temperature against time, illustrating temperature changes that may be expected from prior art Proportional-Integral-Derivative (P-I-D) control.

Turning first to FIG. 1 there is shown a plot for a typical three-mode temperature controller that has been in operation. This, for example, might be used to control the temperature of a plastic extruder. At point a, the heat load is greatly increased. This may be caused, for example, by a dramatic change in ambient temperature. During the resultant decrease in temperature, "rate" action, that is the differential term in the foregoing equation, will increase the heat output (along with the proportional and integral terms) to tend to correct the deviation of the temperature from the 400° set point. Point b is the point of greatest error where all of the correction terms begin to bring the temperature back towards the set point, 400°. However, as the temperature begins to climb back up towards the set point, the entire situation changes. Now, the rate of change of temperature is toward the set point instead of away from it. That is to say, the sign of the error E is still negative, while on the other hand the sign of the differential term, the slope of the curve indicating direction of change, is positive. In a conventional three-mode system, the rate term will continue to oppose the change. At best, this slows the return of the temperature to the set point as shown from b to c in the plot of FIG. 1. The temperature will still get back to the set point due to the contribution of the integral and proportional terms in the equation above, and particularly due to the integral term, but it will take longer to get back to the set point than if the rate term were not present. In fact, if too much rate is used, a picture such as that illustrated from d to e to f in FIG. 1 can result. Here, the effect of the rate in opposing the proportional and integral terms is so great that it actually turns the trend around and causes the temperature to go away from the set point in the two instances g and f shown between E and F.

Figure 2:
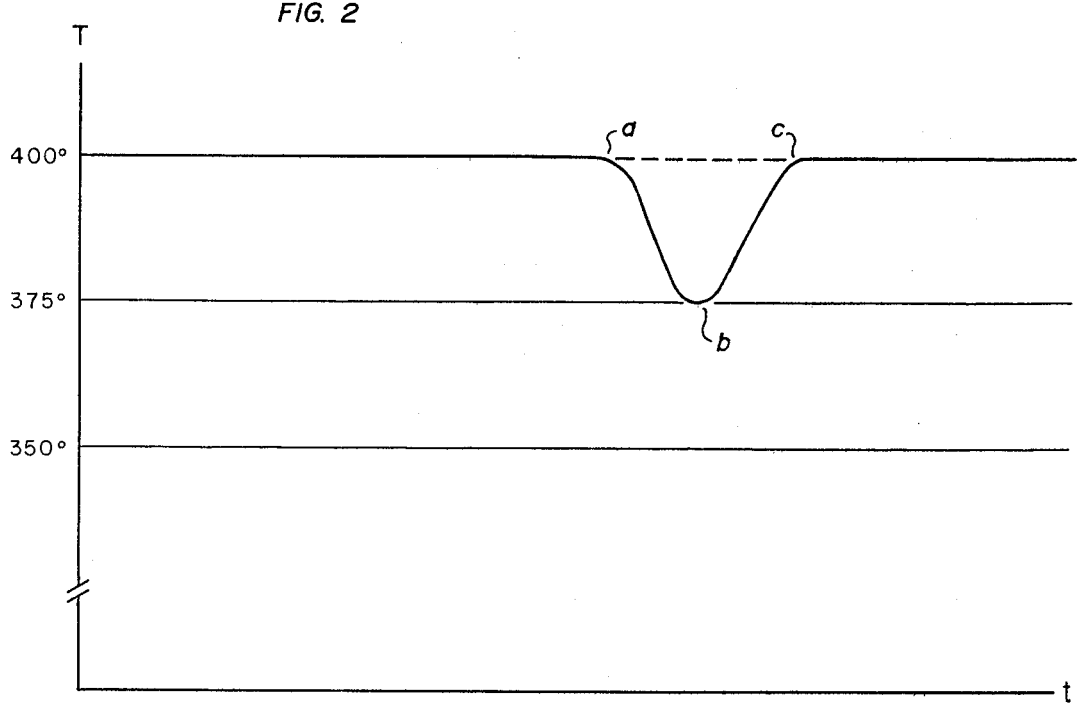
FIG. 2 is a plot of temperature against time, showing temperature variations that may be expected using the improved P-I-D control according to the invention.

In FIG. 2 is shown a plot similar to FIG. 1 as intended to be altered by this invention. Again at a the load is increased. Once more the proportional, integral, and rate terms act just as they did in the conventional system to oppose the excursion away from the 400° set point. From a to b, then, the plot is identical to the plot from a to b of FIG. 1. From b to c', however, the rate term has been substantially reduced, e.g. made zero, negative, or much less. It no longer opposes the correction by the proportional and integral terms and the return towards the set point is faster. None of the reversals as shown at g and h of FIG. 1 appear. Preferably the rate term has been reduced to zero (e.g. discarded) to produce the corrective action plotted in FIG. 2.

Figure 3:
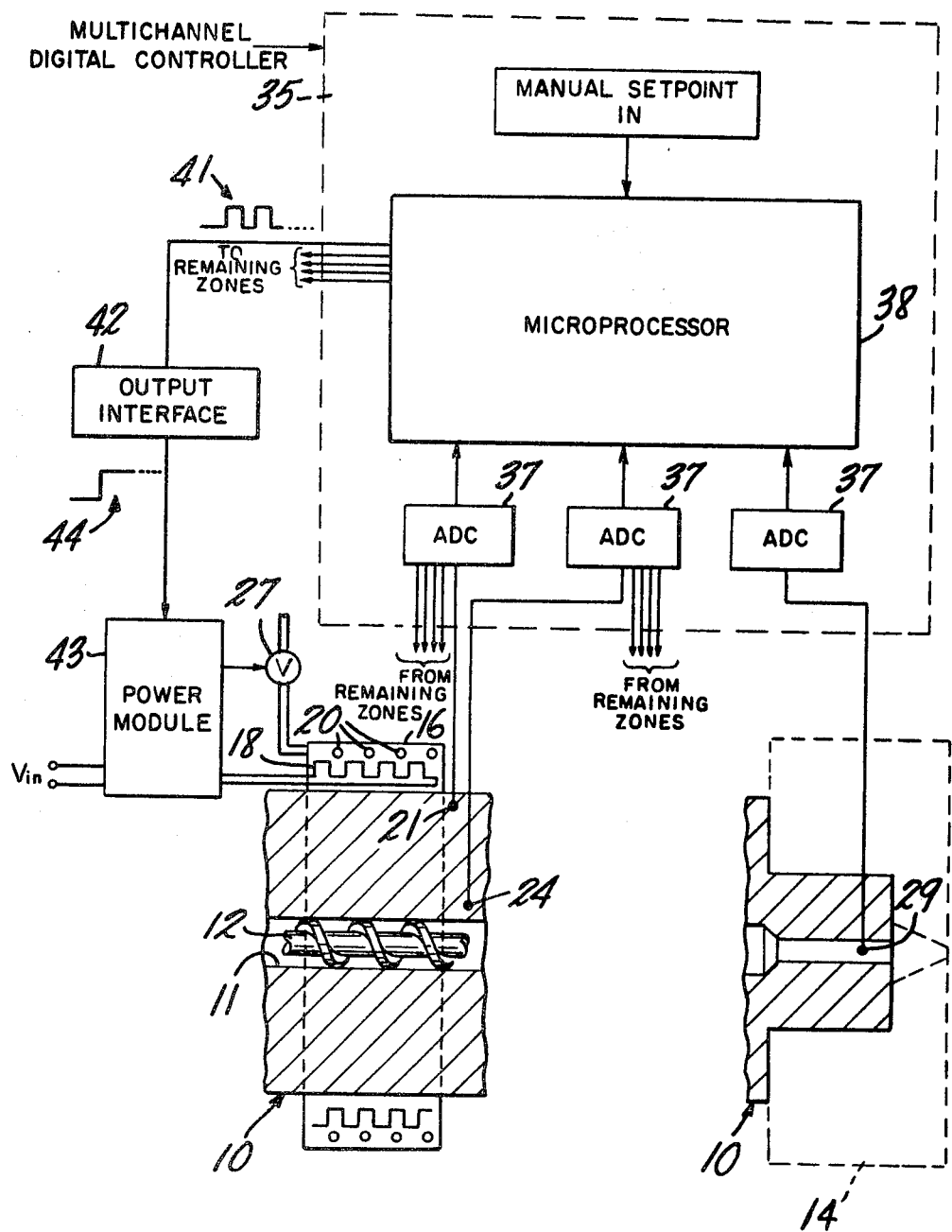
FIG. 3 is a schematic illustration of a controller and one zone of a plastics extruder suitable for use in the process of this invention.

In FIG. 3 a microprocessor based temperature control system is shown schematically in combination with portions of a plastics extruder. The system is suitable for practicing the process according to the invention and is the same as the microprocessor based system of this inventor's U.S. Pat. No. 4,272,466. Briefly, the extruder includes an extruder barrel 10 having a bore 11 in which a screw 12 moves plastic to the right from a location to the left of the figure, where an input hopper (not shown) characteristically introduces pellets of solid plastic. The pellets are conveyed down the bore 11 and melted. The plastic is mixed by the screw 12, and extruded at a die 14. Heaters 16 at a plurality of zones, only one of which is shown in FIG. 3, are each similarly controlled. As is known, each zone has a temperature control unit 16 that includes a heater 18, employing, for example, calrods, and coolant coils 20 in a jacket that is strapped about the barrel 10. Temperature sensors 21 and 24 detect temperatures near the outer and inner surfaces of the barrel. It is the sensor 24 that detects deviation of the temperature of the plastic in the bore from the set point. The shallow sensors 21 and/or a further sensor 24 downstream at the die 14 can be used to control the set point of the zones as described in the aforesaid U.S. Pat. No. 4,272,466 incorporated herein by reference. Alternatively the set points can be maintained at the value ordinarily set into the controller manually, as is conventional practice. The multichannel digital controller 35 can be a commercially available unit such as the Harrel model CP-640 or CP-641. These controllers are capable of controlling the multiple zones of several extruders. Analog to digital converters 37 supply the microprocessor 38 with digital indications of the temperature measured at the shallow sensors 21, the deep sensors 24, and the melt temperature sensor at the die 14. The microprocessor compares the set point temperature to the deep sensor's indication of the temperature of the melt in a particular zone to determine the error E. The microprocessor provides a digital output 41 representative of the proportional, integral, and rate terms of the foregoing equation. An output interface supplies an analog equivalent 44 of the digital output 41 to a power module. This supplies suitably amplified signals to a control valve 27 controlling the flow of coolant in the coils 20 and applies current to the elements of the heater 18.

Figure 4:
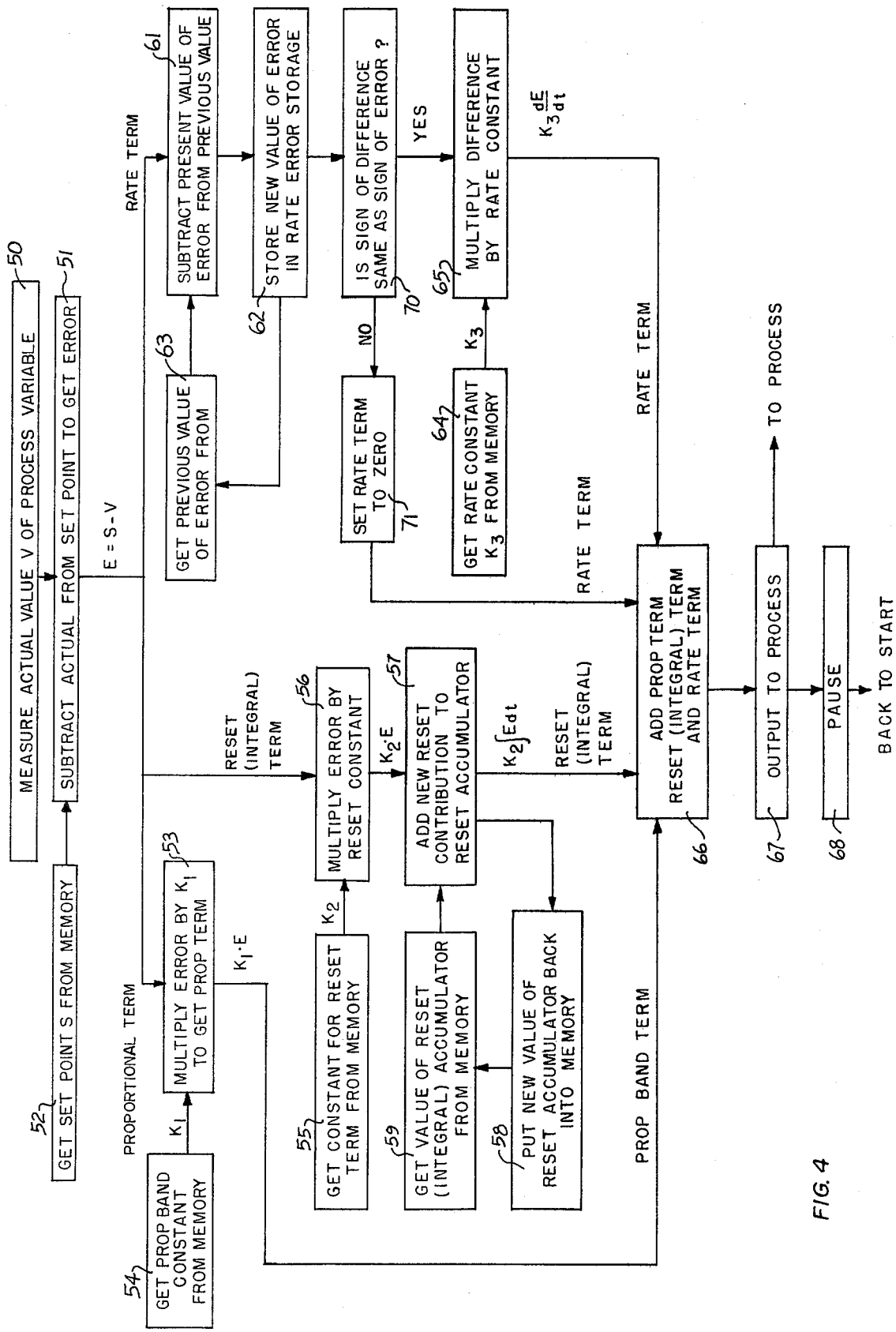
FIG. 4 is a diagramatic illustration or flow chart illustrating the steps in the process according to this invention.

FIG. 4 illustrates the steps of the process in flow chart form. First the actual value of the process variable is measured as shown at 50. The actual value is compared with the set point at 51. In a microprocessor or minicomputer, the set point is retrieved from memory as shown at 52. For clarity, the derivation of the three terms, proportional, integral, and rate are shown as parallel branches rather than in standard flow chart format. The proportional term requires only multiplication, at 53, of the error by $K_1$, taken from memory at 54. For $K_1$, $K_2$ and $K_3$, typical known values for P-I-D control of a particular process can be used. For the reset or integral term, constant $K_2$ is taken from memory at 55, is multiplied times the error at 56. This integral term is arrived at by accumulation of the error as indicated at blocks 57, 58, and 59 to give the complete reset or integral term $K_2 \int E dt$.

The rate term is arrived at by taking the derivative of the error E with respect to time. This can be accomplished conventionally by substraction as shown at steps 61, 62 and 63. Ordinarily, in the P-I-D control process, the rate constant $K_3$ would now be taken from memory and multiplied times the derivative as at steps 64 and 65, the three terms would be added as shown at 66, an output to the process would be generated as at 67, and after a short interval imposed at 68 the correction would be made again. In the process according to the invention, however, the sign of the error E, which is the set point value (s) minus actual value (v) of the controlled parameter, is compared with the sign of the derivative at 70. If the signs differ the rate term is set to zero as shown at 71. Hence the rate term is omitted when its contribution would be opposite that of the proportional and reset terms as described above.

Use of a microprocessor to compare signals representative of the set point and the error and to produce output indications representative of the addition of the proportional, reset, and rate term as set out in the FIG. 4 process can be effectuated easily based on the FIG. 4 flow chart using BASIC, FORTRAN, PASCAL, or any other language. In practice, the steps of the process can be accomplished with the Harrel CP-640 and Harrel CP-641 controllers mentioned above. These use, respectively, Intel 8080 and Intel 8085 microprocessor chips for their microprocessors 38, in FIG. 3. For an example of a P-I-D control program in BASIC, see Fishbeck, "Writing P-I-D Control Loops Easily in BASIC", Control Engineering, October, 1978, p. 45, incorporated herein by reference. In that program, modification of one statement and the addition of a second revises the program to conform to FIG. 4 herein. In the Fishbeck article derivative control is written thus:

10 E=S−V
20 =I+E*RU
30 M=G*(E+I+(E−F)*P*U)
40 F=E
50 WAIT T
60 GO TO 1

E is the current value of the error, while F is the value of the error measured during the previous update. This is achieved by setting F equal to E in line 4. Thus the difference between E and F is a measure of the error rate, assuming that the update rate is fast enough to satisfy sampling theorem requirements. P is the desired pre-act time in minutes, and U is the update rate in updates/minute.

To conform this pertinent portion of the program to the process of FIG. 4 herein, the foregoing is revised as follows:

10 E=S−V

```
20 I=I+E*RU
30 If SGN(E)=SGN(E-F), let M=G*(E+I+-
   (E-F)*P*U)
35 If SGN(E)< >SGN(E-F), let M=G*(E+I)
40 F=E
50 WAIT T
60 GO to 1.
```

The proportional and integral subprograms remain as written the the Fishbeck article. Control of a process based on this revised P-I-D or three-mode method brings the measured, controlled variable towards set point more quickly and eliminates the possibility of the reversals caused by the rate term overcoming the proportional and integral terms as illustrated in FIG. 1.

From the foregoing, it will be seen that an improved control method is provided. The above-described embodiments are exemplary only and these should not be understood to limit the spirit and scope of the invention, as set forth in the appended claims.

I claim:

1. A method of controlling a process having a variable process parameter responsive to electrical control, including the steps of:
   (a) measuring the variable process parameter and representing the process parameter as an electrical signal;
   (b) electrically representing a predetermined set value of the parameters as a set point and comparing the measured parameter to the predetermined set value of the parameter;
   (c) developing an error signal representative of the difference E between the measured parameter and the predetermined set value of the parameter by subtracting the measured parameter signal from the set point signal;
   (d) multiplying the error signal by a constant $K_1$ to develop a signal representative of a proportional term $K_1E$;
   (e) developing an integration signal representative of the integration of E with respect to time;
   (f) multiplying the integration signal by a second constant $K_2$ to develop a signal representative of an integral term $K_2 \int Edt$;
   (g) developing a derivative signal representative of the derivative of E with respect to time;
   (h) comparing the sign of the derivative signal with the sign of the error signal;
   (i) multiplying the derivative signal by a third constant $K_3$ to develop a signal representative of a derivative term $K_3(dE/dt)$, when the signs of the derivative and error signals are alike;
   (j) adding the proportional, integral, and derivative term signals and applying the sum so produced as a process control signal, when the signs of the derivative and error signals are alike;
   (k) replacing said derivative term signal with a reduced signal at least substantially less than $K_3(dE/dt)$, when the signs of the error and derivative signals are unlike; and
   (l) adding the proportional term, integral term, and reduced signals and applying the sum so produced as the process control signal, when the signs of the error and derivative signals are unlike.

2. The method according to claim 1 wherein the step of replacing said derivative term signal with a reduced signal at least substantially less than $K_3(dE/dt)$ comprises replacing the derivative term with zero when the signs of the error and derivative signals are unlike.

3. A method of temperature control for a plastics extruder that has a barrel defining a bore for the movement of plastic therein, a temperature control zone at a location along the path of travel of plastic in the extruder and having a temperature sensing means located in the zone to detect a temperature therein; the temperature control zone being served by a temperature altering means, the temperature altering means being responsive to an electrical control signal from an electrical control means and being coupled to the barrel to alter the temperature of plastic moving in the bore of the barrel responsive to the control signal; the method of temperature control including:
   (a) measuring the temperature of plastic in the bore in the temperature control zone with the temperature sensing means; and
   (b) comparing in the electrical control means the measured temperature to a predetermined temperature set point;
   (c) developing an error signal representative of the difference E between the measured temperature and the predetermined temperature set point;
   (d) multiplying the error signal by a constant $K_1$ to develop a signal representative of a proportional term $K_1E$;
   (e) developing an integration signal representative of the integration of E with respect to time;
   (f) multiplying the integration signal by a second constant $K_2$ to develop a signal representative of an integral term $K_2 \int Edt$;
   (g) developing a derivative signal representation of the derivative of E with respect to time;
   (h) comparing the sign of the derivative signal with the sign of the error signal;
   (i) multiplying the derivative signal by a third constant $K_3$ to develop a signal representative of a derivative term $K_3(dE/dt)$, when the signs of the derivative and error signals are alike;
   (j) adding the proportional term, integral term, and derivative term signals and applying the sum so produced to the temperature altering means as the temperature control signal, when the signs of the derivative and error signals are alike;
   (k) replacing said derivative term signal with a reduced signal at least substantially less than $K_3(dE/dt)$, when the signs of the error and derivative signals are unlike; and
   (l) adding the proportional term, integral term, and reduced signals and applying the sum so produced to the temperature altering means as the temperature control signal, when the signs of the error and derivative signals are unlike.

4. The method according to claim 3 wherein the step of replacing said derivative term signal with a reduced signal at least substantially less than $K_3(dE/dt)$ comprises replacing the derivative term with zero when the signs of the error and derivative signals are unlike.

5. The method according to claim 4, wherein:
   (a) the step of measuring the temperature includes representing the temperature as an electrical signal;
   (b) the step of comparing the measured temperature to the temperature set point includes representing the set point as an electrical signal; and
   (c) the step of developing an error signal includes subtracting the measured temperature signal from the set point signal to develop the signal representative of the difference E.

* * * * *

UNITED STATES PATENT AND TRADEMARK OFFICE
CERTIFICATE OF CORRECTION

PATENT NO. : 4,430,698

DATED : February 7, 1984

INVENTOR(S) : Holton E. Harris

It is certified that error appears in the above-identified patent and that said Letters Patent is hereby corrected as shown below:

In Column 2, line 62, "as" should read --are--.

In Column 5, line 43, "sensor 24" should read --sensor 29--;

Column 5, line 54, "temperature" should read --temperatures--.

In Column 8, line 58, "claim 4" should read --claim 3--.

*Signed and Sealed this*

*Twenty-second* Day of *May 1984*

[SEAL]

*Attest:*

*Attesting Officer*

GERALD J. MOSSINGHOFF

*Commissioner of Patents and Trademarks*